(12) United States Patent
Dilkes

(10) Patent No.: US 8,799,142 B1
(45) Date of Patent: Aug. 5, 2014

(54) CURRENCY TRADING PLATFORM WITH IMPROVED RISK MANAGEMENT

(71) Applicant: FXDirectDealer, LLC, New York, NY (US)

(72) Inventor: Shawn Vulte Dilkes, Mountainside, NJ (US)

(73) Assignee: FXDirectDealer, LLC, New York, NY (US)

( * ) Notice: Subject to any disclaimer, the term of this patent is extended or adjusted under 35 U.S.C. 154(b) by 0 days.

(21) Appl. No.: 13/748,259

(22) Filed: Jan. 23, 2013

(51) Int. Cl.
*G06Q 40/00* (2012.01)
*G06Q 40/04* (2012.01)
*G06Q 40/06* (2012.01)
*G06Q 30/06* (2012.01)

(52) U.S. Cl.
USPC ............. 705/37; 705/36 R; 705/26.1; 705/39; 705/42; 705/44

(58) Field of Classification Search
USPC ....................... 705/36 R–37, 39, 26.1, 42, 44
See application file for complete search history.

(56) References Cited

U.S. PATENT DOCUMENTS

| | | |
|---|---|---|
| 7,536,335 B1 * | 5/2009 | Weston et al. .................. 705/37 |
| 7,844,538 B2 * | 11/2010 | Wallman .......................... 705/37 |
| 8,311,911 B2 * | 11/2012 | Tsagarakis et al. ............. 705/35 |
| 2002/0161692 A1 * | 10/2002 | Loh et al. ......................... 705/37 |
| 2003/0033212 A1 * | 2/2003 | Sandhu et al. .................. 705/26 |
| 2006/0069635 A1 * | 3/2006 | Ram et al. ....................... 705/37 |
| 2009/0138398 A1 * | 5/2009 | Cole et al. ....................... 705/42 |
| 2010/0287114 A1 * | 11/2010 | Bartko et al. ............... 705/36 R |
| 2013/0031002 A1 * | 1/2013 | Hibbard .......................... 705/44 |

* cited by examiner

*Primary Examiner* — Harish T Dass
(74) *Attorney, Agent, or Firm* — Kolisch Hartwell, P.C.

(57) ABSTRACT

Systems, methods and software for processing and displaying information associated with a plurality of currency exchange transactions to a forex dealer in real time, i.e. substantially simultaneously with the receipt or placement of the associated transactions orders or position requests.

20 Claims, 6 Drawing Sheets

Fig. 4

Daily P/L  50,599

Capital  7,227,908

☑ MT First Group  ☑ MT Second Group
☑ Risk Group  ☑ Non-Risk Group  ☑ MM Net Positions

| CP | Amnt, BC | Amnt, CC | PL | Daily BE Rate | Position Threshold |
|---|---|---|---|---|---|
| USD/JPY | 261,701,500 | (19,926,017,492) | 79,016 | 79.81 | 3 |
| EUR/USD | 17,433,001 | (14,055,372) | 3,367 | 1.3109 | 0 |
| GBP/USD | 18,641,000 | (29,672,886) | (31,784) | 1.5386 | 1 |
| USD/CHF | (1,550,000) | 1,432,699 | 0 | 0.9443 | 0 |
| ... | ... | ... | ... | ... | ... |

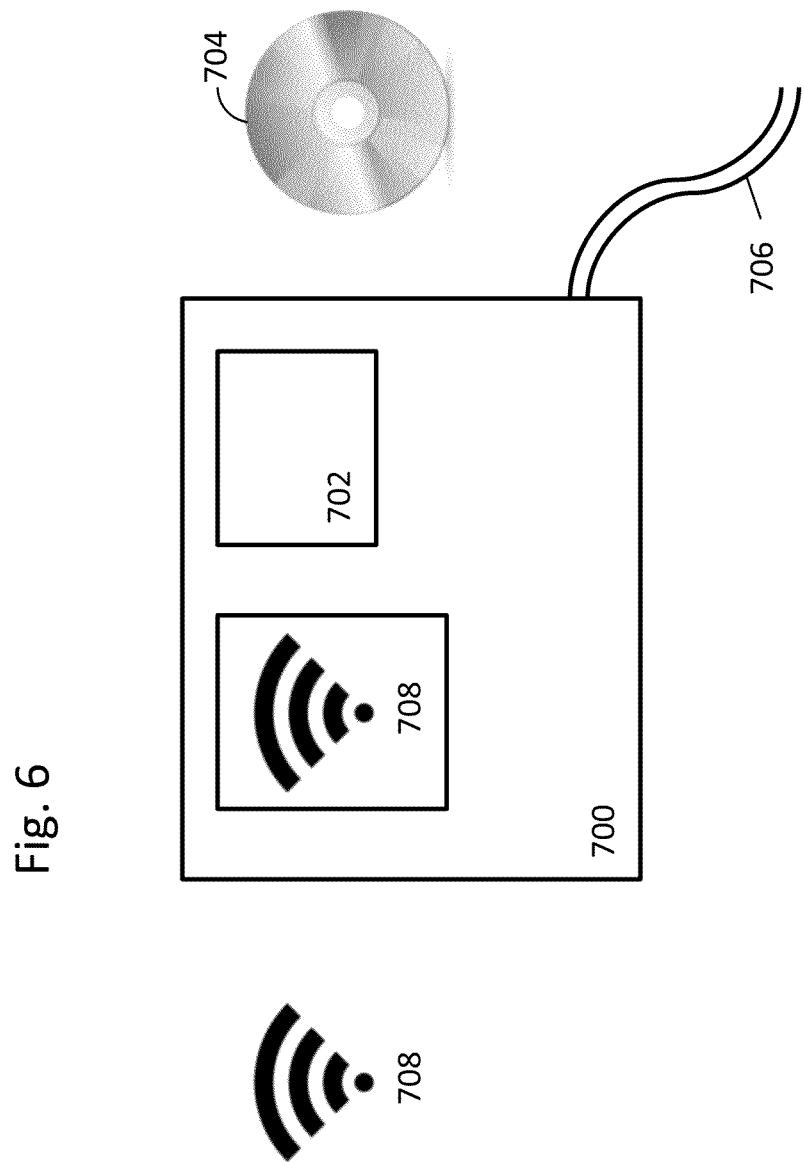

CURRENCY TRADING PLATFORM WITH IMPROVED RISK MANAGEMENT

The foreign exchange ("forex") market is a global decentralized market for trading international currencies, wherein traders attempt to profit from currency pair (CP) exchange rate fluctuations. The present disclosure generally relates to presenting and managing risk factors when brokering foreign exchange trades.

Financial institutions around the world function as anchors of forex trading, as they are individually capable of determining relative values and exchange rates of different currencies. This means that different financial institutions often offer different exchange rates for any given currency pair at any given moment in time. This is in sharp contrast to the securities market, which is centralized, meaning that a security at any given moment in time has a single price.

In a typical forex trade, a trader buys a quantity of a first or counter currency from a financial institution for a quantity of a second or base currency determined by an exchange rate set by the financial institution. This is commonly referred to as opening a position in the base currency of an X/Y currency pair ("CP"), where X is the base currency and Y is the counter currency. If the trader later uses the purchased counter currency to re-purchase the base currency, this is commonly referred to as closing the previously opened position.

Throughout the present disclosure, the symbol Z will be used to represent a "bid rate" offered at the time of the trade for a particular currency pair X/Y by financial institution F. This means that 1 unit of currency X may be used to purchase Z units of currency Y. Traders can open and close positions in either the base currency or the counter currency of a currency pair.

The trader can subsequently wait for the market to appreciate the value of currency Y relative to currency X and then sell a quantity of Y to financial institution F or to another financial institution for a quantity of X determined by an exchange rate Z' which is set by whatever financial institution with which the trader decides to trade. This is commonly referred to as closing a position in the base currency of X/Y, where rate Z' is the "ask rate" at the time of the trade for the said CP, meaning that Z' units of currency Y may be used to purchase 1 unit of currency X. Throughout the present teachings, the term "exchange rate" will be used to represent either a "bid rate" or an "ask rate."

If rate Z' is less than rate Z, then the trader profits. However, if rate Z' is greater than rate Z, then the trader suffers a loss. In this case, since the trader closed their position with the subsequent trade, any profit or loss would be realized, whereas if the trader did not place the subsequent trade, the trader may have potential or unrealized profit or loss due to any difference between rate Z and rate Z'.

The potential profit or loss will be a function of time that varies whenever Z' varies, and the potential profit or loss at any particular instant of time will sometimes be referred to herein as the "instantaneous potential profit" associated with one or more currency exchange transactions or orders. On the other hand, any profit or loss realized through closed trades will be referred to as the "instantaneous actual profit" associated with one or more transactions or orders. When considering a plurality of currency exchange transactions or orders, only some of which have been closed, there will be both instantaneous potential profit (for open orders) and instantaneous actual profit (for closed orders).

Forex trades may also be brokered by a third party dealer. The dealer may receive exchange rate information from multiple financial institutions, each exchange rate typically having a spread between bid and ask rates for each currency pair. For instance, a first financial institution may quote USD/JPY exchange rates of 78-81, wherein 78 is the bid rate, meaning that 1 USD buys 78 JPY, and 81 is the ask rate, meaning that 81 JPY sells for 1 USD; while a second financial institution may quote USD/JPY exchange rates of 79-80. Because dealers typically trade in higher volumes than an average retail customer, the dealer often receives better quotes (e.g., narrower spreads, higher bid, and/or lower ask) than a retail customer would receive.

Typically, the quoted spreads that the dealer receives from financial institutions (dealer quotes, or dealer exchange rates) are shifted by the dealer to form quoted spreads provided by the dealer to a customer (customer quotes, or customer exchange rates). Customer quotes may still be better than the quotes that the retail customer would otherwise receive directly from a financial institution, and the retail customer may therefore decide to become a client of the dealer and to open and close positions through the dealer, rather than directly through a financial institution. Brokering such deals may result in profit for the dealer and/or the client.

A currency exchange order received from a customer will sometimes be referred to herein as a "position request." The dealer may decide to cover a CP position request (e.g., in the form of hard currency, contract, etc.) from a client by placing a corresponding order or position request with a financial institution. In this manner, the dealer is offsetting his position risk, because if the exchange rate for the CP fluctuates, the dealer will not suffer any loss—any loss will instead be covered by either the financial institution or the client who placed the initial CP position request.

Alternatively, the dealer may decide to accumulate a position requested by a first client (i.e., customer) by not placing a corresponding position request with a financial institution. The dealer may want to accumulate this position if the dealer has a second client placing a position request for the same CP in an opposite direction (i.e., the first client requests to buy JPY with USD and the second client requests to sell JPY for USD), thereby creating realized profit for the dealer due to the client quote spread for that CP.

Even if the dealer does not currently have a client with a position request in the opposite direction, the dealer may predict that the position requested by the client will later depreciate, and by not covering the position by placing a corresponding position request with a financial institution, the dealer accumulates a net position, thus creating possible future unrealized profit for the dealer, which may subsequently be realized.

For instance, a first client may open a position of 10 in the base currency of X/Y, and a second client may open a position of 12 in the base currency of X/Y and subsequently close a position of 7 in the base currency of X/Y. If the dealer does not otherwise cover these positions, the dealer will have a net position of 15 (i.e., 10+12−7) in the base currency of X/Y for a position group corresponding to these position requests from the first and second clients. However, accumulating position exposes the dealer to risk—if the exchange rate fluctuates contrary to the dealer's prediction, the dealer may suffer a loss. Thus, a dealer's decisions about whether (or when) to cover particular customer orders by placing analogous position requests with a financial institution determines the dealer's financial risk, and ultimately determines the dealer's profits.

Accordingly, there exists a need for a system and method of presenting risk assessment information and managing risk when brokering foreign exchange trades.

SUMMARY

The present teachings generally relate to systems, methods and software for processing and displaying information associated with a plurality of currency exchange transactions to a forex dealer in real time, i.e. substantially simultaneously with the receipt or placement of the associated orders or position requests.

BRIEF DESCRIPTION OF THE DRAWINGS

FIG. 4 is a simplified screenshot depicting an embodiment of a risk manager screen displayed on a graphical user interface of a computer, according to aspects of the present teachings.

FIG. 6 schematically depicts a computer-readable medium containing program instructions for determining risk associated with currency exchange transactions between a customer, a dealer and a financial institution, according to aspects of the present teachings.

DETAILED DESCRIPTION

I. Overview

Figure 1:
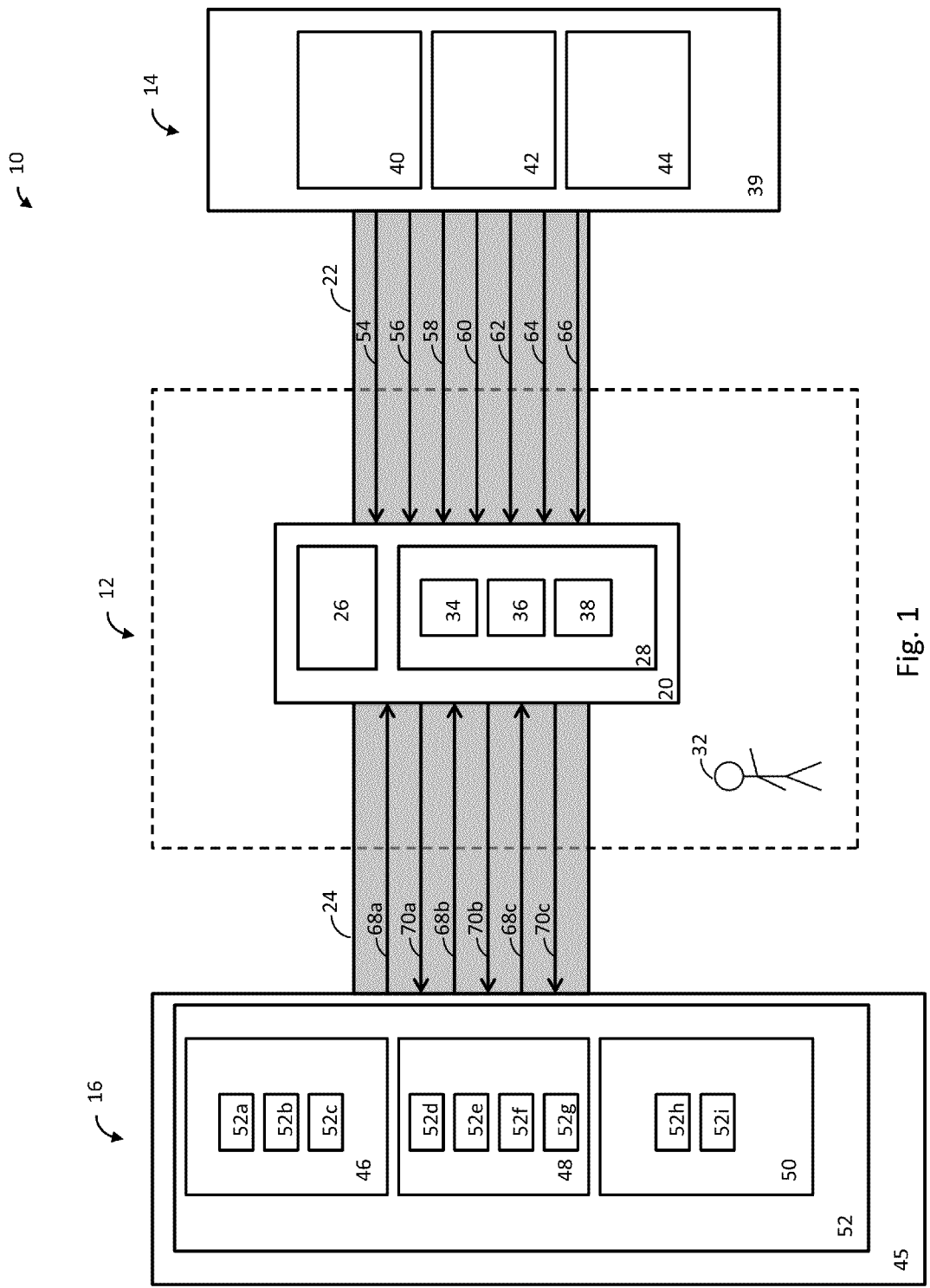
FIG. 1 is a block diagram depicting a risk management system for brokering foreign exchange trades, according to aspects of the present teachings.

This section describes the general features of managing complex currency exchange transactions in real time, according to aspects of the present teachings; see FIG. 1.

FIG. 1 schematically depicts a system, generally indicated at 10, for managing currency exchange transactions. System 10 includes a dealer (or trader) regime generally indicated at 12, a customer (or client) regime generally indicated at 14, and a financial institution regime generally indicated at 16.

The dealer regime includes a computer 20, which is connected to the customer regime by at least a first electronic communication channel 22, and which is connected to the financial institution regime by at least a second electronic communication channel 24. The electronic communication channels may be of any suitable form for transmitting account information, exchange rate quotes, and/or currency exchange orders, such as a secure internet or intranet connection. Furthermore, each electronic communication channel depicted in FIG. 1 may in fact include a plurality of separate channels, to connect the dealer electronically to a plurality of customers and a plurality of financial institutions.

Computer 20 includes a processor 26 configured to determine (i.e., calculate) profit and risk information relating to a plurality of currency exchange transactions substantially in real time, and a graphical user interface 28 configured to display the profit and risk information to the dealer. The manner in which information is calculated and displayed by computer 20 will be described in more detail below.

Processor 26 is generally configured (i.e., by receiving and executing suitable program instructions) to perform various calculations and risk management functions, or in other words to embody various risk management tools that provide information to a dealer 32 within dealer regime 12. These risk management tools are then displayed as screens of information by graphical user interface 28. According to the present teachings, these include a quote manager tool or screen 34, a price control tool or screen 36, and/or a position risk monitor tool or screen 38. Through the use of tools (i.e., screens) 34, 36 and/or 38, dealer 32 may control the manner in which information is displayed by the computer, and the manner in which currency exchange orders are transmitted between the dealer regime computer, the customers and the financial institutions.

Client regime 14 generally includes one or more retail customers 39 or market takers ("MT"), such as MT 40, MT 42, and/or MT 44. A typical customer or MT may include one or more trading entities, such as a single forex trader working from home or over a mobile connection, or a group of forex traders connected through a local area network or a wide area network.

Financial institution regime 16 generally includes one or more financial institutions 45 or market makers ("MM"), such as MM 46, MM 48, and/or MM 50. A typical MM may include any entity capable of liquidating capital in a currency pair (CP), such as a bank, hedge-fund, privately held financial institution, publicly held financial institution, government office, or any other suitable entity.

Dealer 32 may have one or more currency pair accounts in any number of market makers, such as accounts 52, and each account may correspond to any CP, such as USD/JPY, EUR/USD, or any other CP so desired. For example, as shown in FIG. 1, dealer 32 may have three CP accounts in MM 46, such as an account 52a which may be a USD/JPY account, an account 52b which may be a EUR/USD account, and an account 52c which may be a GBP/USD account; dealer 32 may have four CP accounts in MM 48, such as an account 52d which may be a USD/JPY account, an account 52e which may be a EUR/USD account, an account 52f which may be a GBP/USD account, and an account 52g which may be a USD/CHF account; and dealer 32 may have two CP accounts in MM 50, such as an account 52h which may be a USD/JPY account, and an account 52i which may be a USD/CHF account. The dealer accounts depicted in FIG. 1 are merely exemplary. A dealer may have any number of CP accounts in any number of financial institutions.

Dealer 32 may receive one or more customer currency exchange orders or position requests through the first electronic communication channel, such as position requests 54, 56 from MT 40; position requests 58, 60, 62, 64 from MT 42; and position request 66 from MT 44. For example, position requests 54, 58 may correspond to buy requests for USD/JPY; position request 56 may correspond to a sell request for EUR/USD; position request 60 may correspond to a buy request for EUR/USD; position request 62 may correspond to a buy request for GBP/USD; and position requests 64, 66 may correspond to sell requests for USD/CHF. Again, the customer orders depicted in FIG. 1 are merely exemplary.

Graphical user interface 28 may display account and rate data received by computer 20 through communication channel 24 from each MM, such as data 68a from MM 46, data 68b from MM 48, and data 68c from MM 50 for each CP. Based on input from the dealer and/or default settings, computer 20 then may communicate with the MMs to close and/or open positions in dealer accounts 52, such as by communicating a close and/or open position request 70a to MM 46, a close and/or open position request 70b to MM 48, and a close and/or open position request 70c to MM 50, in order to cover positions requested by the one or more market takers (MT).

Of course, customers placing currency exchange orders must first know the bid and ask exchange rates being offered by the dealer for each currency pair. These rates offered to the customer, or customer exchange rates, will generally be less favorable than the most favorable dealer exchange rates offered to the dealer by financial institutions, but more favorable than the exchange rates the customer could obtain directly from financial institutions.

Setting customer exchange rates can be thought of as including two types of considerations. First, the dealer must evaluate the plurality of quotes or exchange rates being offered to the dealer by financial institutions, including not only the quoted rates, but also factors such as the estimated reliability of the quote, the time since the quote was last updated, the volatility of the quote, and any limitations on orders associated with the quote, among others. This evaluation enables the dealer to estimate the best rate the dealer could obtain from a financial institution for a given currency pair at a given instant of time. The factors described above, and the resulting exchange rates that the dealer expects to be available from financial institutions, may be processed and managed by processor 20 through price control tool or screen 36, as will be described in more detail below.

In addition, before setting customer exchange rates, the dealer must determine how much to modify the best rate the dealer can obtain from financial institutions, or "widen the spread" (or otherwise shift the spread, such as by shifting both the bid and the ask in the same direction, or determine not to shift the spread at all) before offering exchange rates to each customer. This also may involve a number of factors, such as the past trading history of the customer, the volume or expected volume of the customer order, the current condition of the market, relevant current events that the dealer believes may affect the market in the future, or a general risk group to which the customer is assigned, among others. These factors, and the resulting customer exchange rates, may be processed and managed by processor 20 through quote manager tool or screen 34, as will also described in more detail below.

After receiving quotes or customer exchange rates from the dealer, customers may place orders with the dealer. As described previously, dealer 32 may process customer currency exchange orders, such as position requests 54, 56, 58, 60, 62, 64, either by placing a corresponding order with a financial institution and thus "covering" the position, or by not placing such a corresponding order and "accumulating" the position. The dealer's decision about whether or not to cover a particular customer order, or all orders or a subset of orders from all customers or a subset of customers, will again be based on a number of factors, which could be generally similar to the factors involved in setting the customer exchange rates. These factors, and the resulting dealer decision about whether or not to cover a position request, or an accumulation of position requests, may be processed and managed by processor 20 through risk monitor tool or screen 38, the features of which will be described in more detail below.

II. Quote Manager

Figure 2:
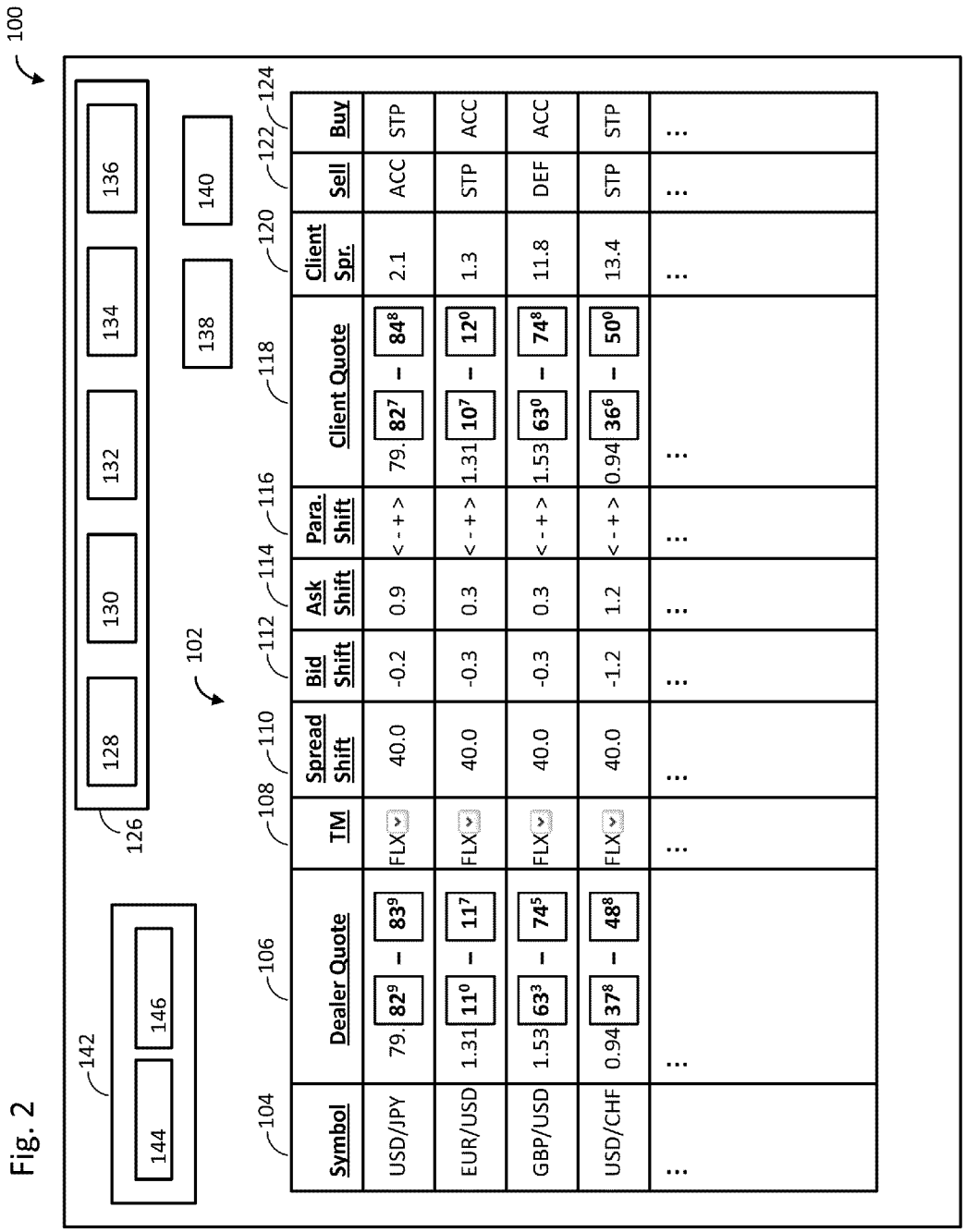
FIG. 2 is a simplified screenshot depicting an embodiment of a quote manager screen displayed on a graphical user interface of a computer, according to aspects of the present teachings.

This section describes features of a quote manager tool or screen that may be used by a dealer to analyze factors, including risk factors, relating to customer exchange rates offered by a dealer; see FIG. 2.

FIG. 2 depicts a simplified screen shot of an embodiment of quote manager tool 34, generally indicated in FIG. 2 at 100. Quote manager tool 100 may include a currency pair quote manager table, generally indicated at 102, having a currency pair symbol column 104, a dealer quote or dealer exchange rate column 106, a transformation selector column 108, a spread shift column 110, a bid shift column 112, an ask shift column 114, a parallel shift column 116 which dealer 32 may use to shift bid and ask rates in a parallel direction (i.e., shift both the bid and the ask in the same direction), a client quote or client exchange rate column 118, a client quote spread column 120, a sell processing selector column 122, and a buy processing selector column 124.

Column 104 may display symbols for currency pairs with which dealer 32 desires to broker trades. As shown in FIG. 2, column 104 may display USD/JPY, EUR/USD, GBP/USD, and USD/CHF, for example. Typically, dealer 32 brokers a vast array of currency pairs, but only four pairs are shown in FIG. 2 for simplicity.

As discussed above in regard to FIG. 1, dealer 32 may receive data from each financial institution or market maker, such as account information and exchange rate quotes, which may include dealer quotes for currency pairs. The best available bid and ask rates for each currency pair may then be displayed in column 106 in real time (see discussion of FIG. 3 below for how dealer 32 may determine the best available rate for each currency pair).

Dealer 32 may use a pull down menu in each row of transformation selector column 108 to select an equation for how each dealer quote will be transformed into a corresponding client quote. For example, each pull down menu may have the following options: Float Transformation (FLT), Float Maximum Transformation (FLX), Fixed Bid Transformation (FXB), Fixed Ask Transformation (FXA), Fixed Middle Transformation (FXM), Fixed Rounded Middle Transformation (FXR), and Float Rounded Maximum Transformation (FLR). Each of these transformations may use the dealer 32 determined data from columns 110, 112, 114, 116, and 120 to calculate client quotes in column 118. In FIG. 2, dealer 32 has selected the FLX transformation for each currency pair, but more generally, dealer 32 may choose different transformations for different currency pairs.

For instance, FXA may calculate an ask client quote of column 118 by adding an ask shift value from column 114 to the ask quote from the dealer quote of column 106, and may calculate a bid client quote of column 118 by subtracting a spread shift value of column 110 from the bid quote from the dealer quote of column 106; FXB may calculate an ask client quote by adding an spread shift value of column 110 to the bid quote from the dealer quote of column 106, and may calculate a bid client quote by subtracting a spread shift value from the bid quote from the dealer quote of column 106.

In the following examples of transformation equations from transformation selector column 108, "CTQuote.ask" may correspond to an ask client quote in column 118; "CTQuote.bid" may correspond to a bid client quote in column 118; "DDQuote.ask" may correspond to an ask dealer quote in column 106; "DDQuote.bid" may correspond to a bid dealer quote in column 106; "spread" may correspond to a spread shift value from column 110; "bid_shift" may correspond to a bid shift value from column 112; "ask_shift" may correspond to an ask shift value from column 114; "CTQuote.spread" may correspond to a value for a client quote spread from column 120; "min_spread_value" and "max_spread_value" may respectively correspond to a minimum and maximum spread values for each currency pair determined by dealer 32; "ResultedCTQuote.ask" and "ResultedCTQuote.bid" may respectively correspond to recalculated ask and bid client quotes of column 118; and "TransformatedCTQuote.ask" and "TransformatedCTQuote.bid" may respectively correspond to transformed ask and bid client quotes from column 118.

The following equations are examples only. More generally, column 108 may access any transformation so desired by dealer 32:

Fixed Ask (FXA):

$$CTQuote.ask = DDQuote.ask + ask\_shift$$

$$CTQuote.bid = CTQuote.ask - spread$$

Fixed Bid (FXB):

$$CTQuote.bid = DDQuote.bid + bid\_shift$$

$$CTQuote.ask = CTQuote.bid + spread$$

Fixed Middle (FXM):

$$CTQuote.ask = 0.5*(DDQuote.ask + DDQuote.bid + spread) + bid\_shift$$

$$CTQuote.bid = 0.5*(DDQuote.ask + DDQuote.bid - spread) + bid\_shift$$

Float Minimum (FLT):
FLT transformation limits minimum spread.

$$CTQuote.ask = DDQuote.ask + ask\_shift$$

$$CTQuote.bid = DDQuote.bid + bid\_shift$$

$$CTQuote.spread = CTQuote.ask - CTQuote.bid$$

Check if CTQuote.spread<min_spread_value, then the system should apply "Fixed Middle" transformation with bid_shift=0 and min_spread_value:

$$ResultedCTQuote.ask = 0.5*(CTQuote.ask + CTQuote.bid + min\_spread\_value)$$

$$ResultedCTQuote.bid = 0.5*(CTQuote.ask + CTQuote.bid - min\_spread\_value)$$

Float Maximum (FLX):
FLX transformation equals FLT but limits maximum spread instead of minimum.
If the bank price is inverted (DDQuote.ask<DDQuote.bid) then the middle is used to calculate $$CTQuote.ask = 0.5*(DDQuote.ask + DDQuote.bid) + ask\_shift$$

$$CTQuote.bid = 0.5*(DDQuote.ask + DDQuote.bid) + bid\_shift$$

Otherwise:

$$CTQuote.ask = DDQuote.ask + ask\_shift$$

$$CTQuote.bid = DDQuote.bid + bid\_shift$$

Then CTQuote.spread=CTQuote.ask−CTQuote.bid;

Check if CTQuote.spread>max_spread_value and CTQuote.spread>=0, then the system should apply "Fixed Middle" transformation with bid_shift=0 and max_spread_value:

$$ResultedCTQuote.ask = 0.5*(CTQuote.ask + CTQuote.bid + max\_spread\_value)$$

$$ResultedCTQuote.bid = 0.5*(CTQuote.ask + CTQuote.bid - max\_spread\_value)$$

If CTQuote.spread<0, then the system should apply "Fixed Middle" transformation with bid_shift=0 and spread_value=0:

$$ResultedCTQuote.ask = ResultedCTQuote.bid = 0.5*(CTQuote.ask + CTQuote.bid)$$

Fixed Round Transformation (FXR):

$$CTQuote.spread = floor(spread)*PipPrice;$$

$$CTQuote.bidshift = floor(bid\_shift)*PipPrice;$$

$$Round\_factor = abs(log(10, PipPrice));$$

where PipPrice for corresponding CP is used.

$$CTQuote.ask = round((0.5*(DDQuote.ask + DDQuote.bid)), Round\_factor);$$

$$CTQuote.bid = round((0.5*(DDQuote.ask + DDQuote.bid)), Round\_factor);$$

$$ResultedCTQuote.bid = CTQuote.bid - 0.5*CTQuote.spread + CTQuote.bidshift;$$

$$ResultedCTQuote.ask = CTQuote.ask + 0.5*CTQuote.spread + CTQuote.bidshift;$$

In the transformation the following math operations are used:
floor (A) is a function which rounds the elements of A to the nearest integers less than or equal to A;
abs( ) is an absolute value (magnitude);
log(10,N) is a decimal logarithm;
round( ) is function which rounds to nearest integer;

Float Round Transformation (FLR):
FLR transformation equals to FLX but the resulted quotes are rounded:
If the bank price is inverted (DDQuote.ask<DDQuote.bid) then the middle is used to calculate $$CTQuote.ask = 0.5*(DDQuote.ask + DDQuote.bid) + ask\_shift$$

$$CTQuote.bid = 0.5*(DDQuote.ask + DDQuote.bid) + bid\_shift$$

Otherwise:

$$CTQuote.ask = DDQuote.ask + ask\_shift$$

$$CTQuote.bid = DDQuote.bid + bid\_shift$$

Then CTQuote.spread=CTQuote.ask−CTQuote.bid;

Check if CTQuote.spread>max_spread_value and CTQuote.spread>=0, then the system should apply "Fixed Middle" transformation with bid_shift=0 and max_spread_value:

$$TransformatedCTQuote.ask = 0.5*(CTQuote.ask + CTQuote.bid + max\_spread\_value)$$

$$TransformatedCTQuote.bid = 0.5*(CTQuote.ask + CTQuote.bid - max\_spread\_value)$$

If CTQuote.spread<0, then the system should apply "Fixed Middle" transformation with bid_shift=0 and spread_value=0:

$$TransformatedCTQuote.ask = TransformatedCTQuote.bid = 0.5*(CTQuote.ask + CTQuote.bid)$$

And as a result:

$$RoundFactor = abs(log(10, PipPrice));$$

where PipPrice for corresponding CP is used.

$$ResultedCTQuote.bid = floor(TransformatedCTQuote.bid*1/PipPrice)*PipPrice;$$

$$ResultedCTQuote.ask = ceil(TransformatedCTQuote.ask*1/PipPrice)*PipPrice;$$

In the transformation the following math operations are used:

floor (A) is a function which rounds the elements of A to the nearest integers less than or equal to A (round down);

ceil (A) is a function which rounds the elements of A to the nearest integers more than or equal to A (round up);

abs( ) is an absolute value (magnitude);

log(10,N) is a decimal logarithm;

Client quotes from column 118 may be communicated to any number, group, or tier of customers or market takers, such as MT 40, MT 42, and MT 44. Any of these market takers may then place orders to sell or buy the base currency or the counter currency in any of the corresponding currency pairs. Generally, the exchange rates offered to each customer will be based at least partially on various factors chosen by the dealer, such as whether or not the customer is assigned to a high risk group, the volume of the order received from the customer, a predefined setting associated with the customer (for instance, based on the past order history or order performance of the customer), and/or a market condition at the time the customer places the order, among others. Some examples of how these factors may be used to influence customer exchange rates are discussed below.

By using pull down tabs in respective sell processing selector column 122 and buy processing selector column 124, dealer 32 may separately select a process by which sell orders are processed and by which buy orders are processed. For example, dealer 32 may select to accumulate (ACC) position requested for USD/JPY in the sell direction by selecting ACC in column 122 for USD/JPY, and may select to straight through process (STP) position requested for USD/JPY in the buy direction by selecting STP in column 124 for USD/JPY. Alternatively dealer 32 may select to apply a default mode of processing (DEF) which may apply a client selected account mode for processing, which may include a preference for STP or ACC corresponding or not corresponding to any or all currency pairs in either direction.

Dealer 32 may adjust any of the values and/or selections in columns 108, 110, 112, 114, 116, and 120, and by doing so may adjust corresponding client quotes in column 118. Dealer 32 may save adjustments to columns 108, 110, 112, 114, 116, and 120 by clicking on an apply button 138, and dealer 32 may undo adjustments to columns 110, 112, 114, 116, and 120 by clicking on reset button 140. As shown in FIG. 2, quote manager 100 may include market condition presets 126, such as preset 128 which may correspond to a standard market condition (e.g., when trade volume, rates, and/or other market conditions are at substantially average levels), preset 130 which may correspond to a slow market condition (e.g., when trade volume, rates, and/or other market conditions are substantially below average levels), preset 132 which may correspond to a fast market condition (e.g., when trade volume, rates, and/or other market condition are substantially higher than average levels), preset 134 which may correspond to an event market condition (e.g., a scheduled or unscheduled government report relating to an economic factor such as gross domestic product or quantitative easing), and preset 136 which may correspond to a news flash market condition (e.g., breaking news of political unrest, etc.). Dealer 32 may preset values in columns. Presets 126 may allow dealer 32 to quickly modify client quotes in column 118 in reaction to quickly changing market conditions, which may result in higher profits for dealer 32. Although five presets are depicted in FIG. 2, this is arbitrary. More generally, quote manager 100 may incorporate any desired number of presets, corresponding to any desired predetermined treatment of client exchange rates.

Dealer 32 may save adjustments to columns 108, 110, 112, 114, 116, and 120 into one or more market condition presets 126 by clicking and holding down for a predetermined amount of time any one of one or more market condition presets 126. At a later time, if dealer 32 determines that the market is operating under a market condition corresponding to one of presets 126 (.e.g., a news flash of political unrest occurs), dealer 32 may click on the corresponding preset (e.g., preset 136), which then substantially simultaneously adjusts client quote exchange rate spreads that were predetermined by dealer 32 for that market condition (e.g., substantially widens client quote spreads to offset risk of political unrest causing abnormal fluctuations in dealer quotes).

Quote manager 100 may also include one or more tier tabs 142, which may allow dealer 32 to adjust table 102 for different tiers of clients, such as a tab 144 corresponding to a first tier of clients, and a tab 146 corresponding to a second tier of client. For example, dealer 32 may desire to communicate relatively narrower spread client quotes (i.e., relatively more favorable customer exchange rates) to market takers who typically deal in higher volumes of position, and relative wider spread client quotes (i.e., relatively less favorable customer exchange rates) to market takers who typically deal in lower volumes of position. Thus, dealer 32 may desire to separate market takers into different tiers or classes, where each class of customer receives different exchange rates that depend on the likelihood that the customer will place an order having a volume in a particular range. Dealer 32 may also save these adjustments for different client tiers in market condition presets 126.

III. Price Control

Figure 3:
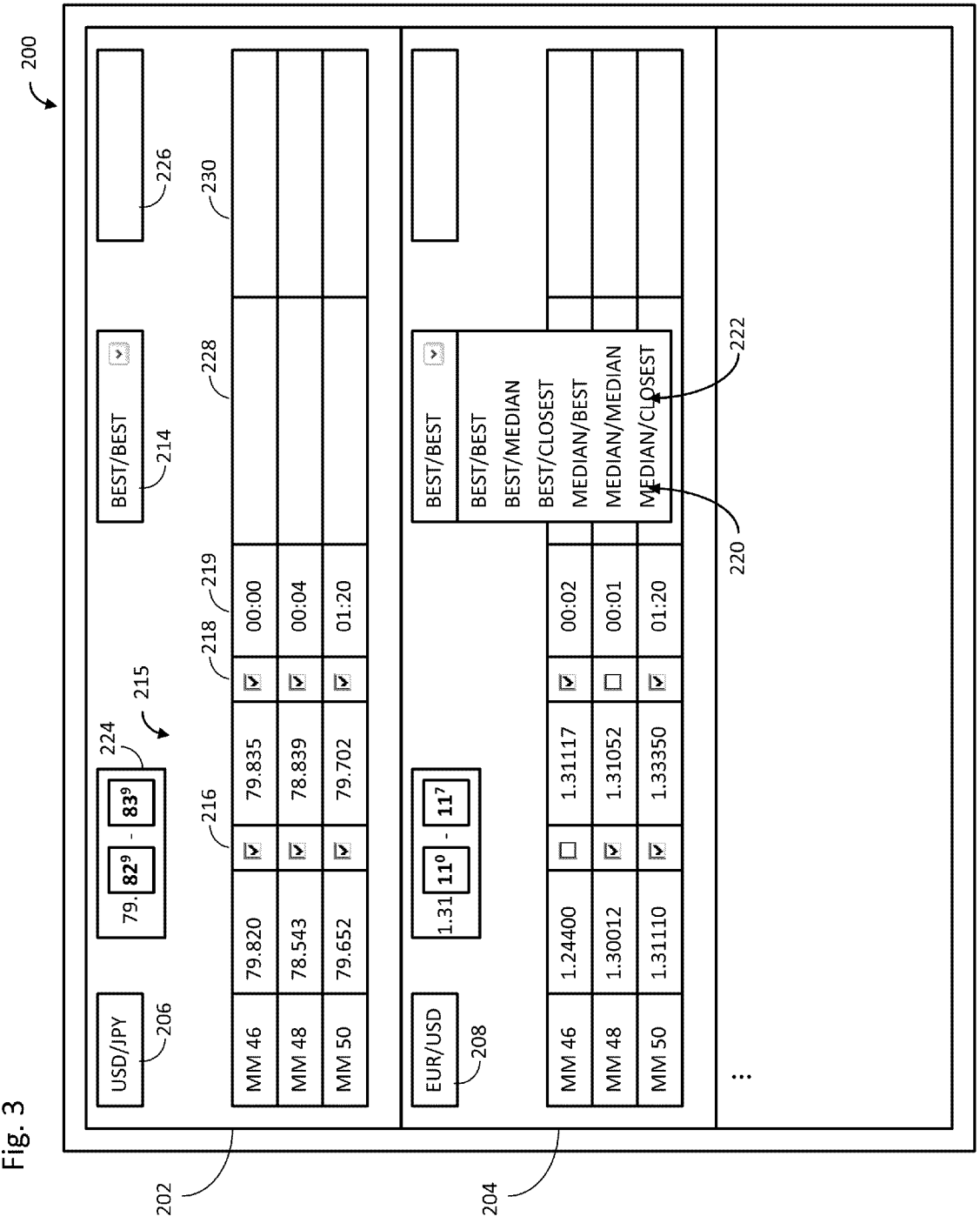
FIG. 3 is a simplified screenshot depicting an embodiment of price control screen displayed on a graphical user interface of a computer, according to aspects of the present teachings.

This section describes features of a price control tool or screen that may be used by a dealer to analyze factors, including risk factors, relating to dealer exchange rates offered to a dealer by financial institutions; see FIG. 3.

FIG. 3 depicts a simplified screen shot of an embodiment of a price control tool or screen, generally indicated at 200. Price control tool 200 may include a currency pair price control section for each currency pair that dealer 32 desires to trade, such as a first currency pair price control section 202 and a second currency pair price control section 204, which are shown to respectfully correspond to a first currency pair 206, shown here as USD/JPY, and a second currency pair 208, shown here as EUR/USD. Each section may list market makers available to dealer 32, such as MM 46, MM 48, and MM 50.

Each control section may also include a quote generation strategy pull down menu 214, which may be used by dealer 32 to specify which price algorithm will be selected when several market makers send quotes to dealer 32. Price control 200 may provide one or more types of quote generation strategy, such as a general quote strategy 220 shown before the slash in menu 214, and a two banks quote strategy 222 shown after the slash in menu 214. Dealer 32 may select quote strategies with each menu 214 for each section, each section corresponding to a different currency pair.

As shown in FIG. 3, general quote strategy 220 may support a BEST strategy and a MEDIAN strategy, and two banks quote strategy 222 may support the BEST strategy, the MEDIAN strategy, and a CLOSEST strategy. Two banks quote strategy 222 may be used when only two banks quote bid and ask rates. The BEST strategy may select a highest bid rate and a lowest ask rate available from selected market makers. The CLOSEST strategy may select a rate from a market maker that is closest to a previous rate quoted by that market maker. The MEDIAN strategy may select a rate in one of two ways. For example, if an even number of market makers send quotes, the MEDIAN strategy may calculate a bid rate that is an arithmetical mean (average) of bid rates from those quotes and an ask rate that is an arithmetical mean (average) of ask rates from those quotes. However, if an odd number of market makers send quotes, then the values may be sorted in ascending order and the value that is in the middle of that order may be selected as the MEDIAN strategy rate.

Price control tool 200 may also include a selection mechanism, generally indicated at 215, allowing the dealer to selectively determine whether a particular rate will be considered in the algorithm for determining the effective exchange rate offered to the dealer. For example, the price control tool may include two check boxes for each market maker in each section, such as bid rate checkboxes 216 and ask rate checkboxes 218, respectively corresponding to a bid quote and an ask quote received by dealer 32 from each market maker. If dealer 32 checks one of these check boxes, then a quoted rate associated with that checkbox will be factored into the selected quote generation strategy, but if dealer 32 un-checks one of these checkboxes then the quoted rate associated with that checkbox will not be factored into the selected quote generation strategy.

Selection mechanism 215 may allow dealer 32 to selectively generate a best available rate for the currency pair of each section, such as best available rate 224 for section 202. It should be appreciated that the selection mechanism, such as checkboxes 216, 218, may allow dealer 32 to selectively form a best available rate that may not otherwise be available from a single market maker, such as best available rate 224 which is indicated to have a bid rate of 79.829 and an ask rate of 78.839. On the other hand, the selection mechanism embodied by checkboxes 216, 218 also allows the dealer to ignore some or all of the rates offered by particular financial institutions, for instance if the dealer believes the rates are unreliable or likely to change quickly.

After determining which rates offered by financial institutions to consider, a best available rate, such as best available rate 224, may then be automatically entered for a corresponding currency pair in dealer quote column 106 of quote manager 100 (see FIG. 2 and accompanying description above).

In price control tool 200, quotes matching a quote generation strategy may be indicated to dealer 32 with a background color that is lighter, darker, or has a distinctive shade or some other distinctive property. For example, the BEST strategy bid and ask rates for section 202 may be shown in a lighter shade, and the MEDIAN strategy bid and ask rates for section 202 may be shown in a darker shade. Indications such as these may allow dealer 32 to more effectively choose a quote generation strategy and check/uncheck checkboxes 216, 218.

Each section of price control tool 200 may also include a time indication field 218 for each market maker quote, which may show the amount of time that has elapsed since the corresponding quote has been updated. As such, field 218 may indicate a level of accuracy for the corresponding quote, and may assist the dealer in determining whether to exclude certain quotes from the quote determination algorithm.

Each section of price control tool 200 may also have a field 226 for displaying the total net position dealer 32 has in marker maker accounts, such as accounts 52; a column 228 for displaying how much open position dealer 32 has in each associated market maker; and a column 230 for displaying a maximum trade associated with rates quoted by the market makers.

IV. Risk Monitor

This section describes features of a risk monitor tool or screen that may be used by a dealer to analyze factors, including risk factors, relating to a dealer's decision regarding whether or not to cover a customer position by placing an analogous order with a financial institution; see FIG. 4.

FIG. 4 depicts a risk monitor tool or screen, generally indicated at 500, which is an embodiment of risk monitor tool 38 depicted in FIG. 1 and previously described more generally. Risk monitor tool 500 may allow dealer 32 to assess and manage accumulated position risk in real time, by displaying information associated with currency exchange transactions in real time. As shown in FIG. 4, risk monitor tool 500 includes a table 501 for conveying risk assessment; two or more checkboxes 512 that may allow dealer 32 to segregate risk groups; a capital field 524; and a daily profit loss indicator 526.

Table 501 includes a currency pair column 502, which lists the names of all currency pairs brokered by dealer 32 and may be sorted by currency pair importance or demand; an amount of cumulative position in base currency column 503; an amount of cumulative position in counter currency column 504; a profit loss column 506; a daily breakeven rate column 508; and a position threshold column 510.

In the exemplary embodiment of FIG. 4, check boxes 512 include box 514 corresponding to a first group of customers or market takers, box 516 corresponding to a second group of customers or market takers, box 518 corresponding to a risk group (or high risk group) of customers or market takers, box 520 corresponding to a non-risk group (or low risk group) of customers or market takers, and box 522 corresponding to accumulated net positions of dealer 32 in market maker (MM) accounts—some or all of which may cover at least a portion of the accumulated position of dealer 32 from corresponding market takers (MT).

More generally, the risk monitor tool may include any mechanism allowing a dealer to assign each customer to one or more groups and to select a subset of the groups to which to restrict the information to be displayed. These groups may include one or more groups based on different levels of perceived risk to the dealer associated with orders received from the customer, one or more groups based on a geographic distinction of the customers in the group, such as the country or region in which the customer's order was placed or received, and any other desired groups representing different distinctions the dealer may wish to make between customers, for purposes of displaying information relating to customer orders.

In the specific example of FIG. 4, by checking or unchecking one, all, or a subset of two or more checkboxes 512, dealer 32 can select specific groups of market takers (MT) and/or market makers (MM) and the corresponding net positions of dealer 32 to be included in the calculation of data in columns 503, 504, 506, 508, 510 for each currency pair in currency pair column 502. For example, if dealer 32 only checked box 514, which may correspond to a first group of MT net positions (i.e., net positions that dealer 32 has as a result of accumulating position from the first group of MT), then only the net positions of dealer 32 corresponding to positions accumulated from position requests from that group of market takers will factor into data displayed in columns 503, 504, 506, 508, 510.

More generally, computer 20 is configured to receive a group indicator for each customer associating each customer with one or more of a plurality of groups, including at least a high risk group and a low risk (or non-risk) group. The group indicator may, for example, be provided through a separate customer data entry screen, or it may be provided through a drop-down menu or some other feature related to or stemming from the risk monitor tool. Through the risk monitor screen, the computer is then configured to receive subset selection information corresponding to a dealer's selection of a subset of the groups, for example through selection by the dealer of a desired subset of check boxes 512. The computer is then configured to display on the graphical user interface of risk monitor screen 500, substantially simultaneously with selection of the subset of the groups, various desired information including the instantaneous potential profit associated with each currency pair and restricted to the customer orders placed by customers in the selected subset.

More specifically, column 503 displays the cumulative amounts of open positions for each currency pair in the base currency of each currency pair. If the total cumulative amount of position is in the buy direction, then the amount is shown without parentheses. If the total cumulative amount of position is in the sell direction, then the amount is shown in parentheses.

Column 504 displays the cumulative amount of open positions for each currency pair in the counter currency of each currency pair. If the total cumulative amount of position is in the buy direction, then the amount is shown without parentheses. If the total cumulative amount of position is in the sell direction, then the amount is shown in parentheses.

Column 506 displays the profit or loss value in USD for positions of dealer 32 in each currency pair. These values are recalculated automatically after new rates are received, such as best available rates formed by dealer 32 with price control tool 200. Values in column 506 are positive when shown without parentheses and negative when shown in parentheses.

Column 508 displays daily break even rates for each currency pair in order for the profit loss value for that currency to be zero.

Column 510 displays position threshold level indicators, which dealer 32 can set up for each currency pair in order to alert dealer 32 that some larger than normal position risk is present in the data of table 501. Examples of threshold levels may include absolute, relative, maximum, and/or minimum amounts of base currency, counter currency, and/or profit loss value for each currency pair, but each currency pair need not have the same type of position threshold nor the same position threshold levels. The indicators may be numbers, such as 0-1-2-3-4, where 0 indicates normal risk and 3 representing unusually high risk. The levels may also be indicated with color to help alert dealer 32, such as a background color for 0, yellow for 1, orange for 2, and red for 3.

A capital field 524 displays an amount of capital of dealer 32 in USD, which may be a total, partial, estimated, or calculated amount of capital determined in any manner suitable to dealer 32. A daily profit loss field 526 displays a total amount of profit loss value from column 506 for a current forex day. At the end of the forex day, field 526 may be set to zero.

By checking all of checkboxes 512, it may be possible to view the overall instantaneous position risk of dealer 32 in each currency pair, because in this case the information shown in table 501 and in boxes 524, 526 will reflect all of the positions accepted or ordered by the dealer, including all open customer orders and also including all covered customer orders.

Alternatively, dealer 32 may check a subset of checkboxes 512, thus allowing dealer 32 to segregate one or more groups of accumulated net positions. For example, dealer 32 may view position risk assessment corresponding to groups previously identified as high risk customers by checking box 518 and thus selecting the risk group subset of customers. If this is the only box checked by the dealer, then the amount displayed in profit/loss box 526 will be the instantaneous potential profit associated with each currency pair and corresponding to orders placed by customers in the risk group. In general, by selecting a desired subset of one or more groups to which to restrict the instantaneous profit to be displayed, the dealer can cause the computer to display on screen 500 a restricted instantaneous potential profit associated with each currency pair and corresponding to the orders placed by customers in the selected subset. This can be done substantially simultaneously with receiving the information sufficient to select the subset.

On the other hand, if the dealer has covered a subset of customer orders by carrying out currency exchanges with financial institutions, then the dealer can check box 522 to see the effect of covering these positions. For example, if box 522 is the only box checked, then the amount displayed in profit/loss box 526 will be the instantaneous actual profit associated with each currency pair and corresponding to the covered subset of orders. If another of boxes 512 is also checked, corresponding to selection of a subset group of customers, then a revised instantaneous potential profit will be displayed in box 526, associated with each currency pair based on the restricted instantaneous potential profit and the instantaneous actual profit. Computer 20 will generally be configured to update and display information on the risk management screen simultaneously with accepting and/or covering orders, i.e., substantially in real time.

Similar to table 501, the value of this field also depends on which of checkboxes 512 dealer 32 checks. During the forex day, risk monitor 500 may continually or at intermitted times check the amount in daily profit loss field 526 against the amount of capital displayed in capital field 524. If the amount of daily profit/loss is less than a first percentage of capital, such as 32%, then the risk monitor 500 may indicate this to dealer 32, such as by flashing yellow in capital field 524. If the amount of daily profit/loss is less than a second percentage of capital, such as 40%, then the risk monitor 500 may indicate this to dealer 32, such as by flashing red in capital field 524.

Risk monitor 500 may help dealer 32 to decide whether or not to cover positions or customer orders, thus offsetting risk. If dealer 32 determines that the assessed position risk of a currency pair shown in table 501 is too high, then dealer 32 may cover this position by clicking on the currency pair row thus accessing a covering ticket, which may be preset with a market maker account that may have a best available rate from price control 200, the total amount in base currency for the selected currency pair, and a direction that is opposite of a total direction for the selected currency pair. This position may then be covered online or offline, such as over the phone.

V. Exemplary Methods

Figure 5:
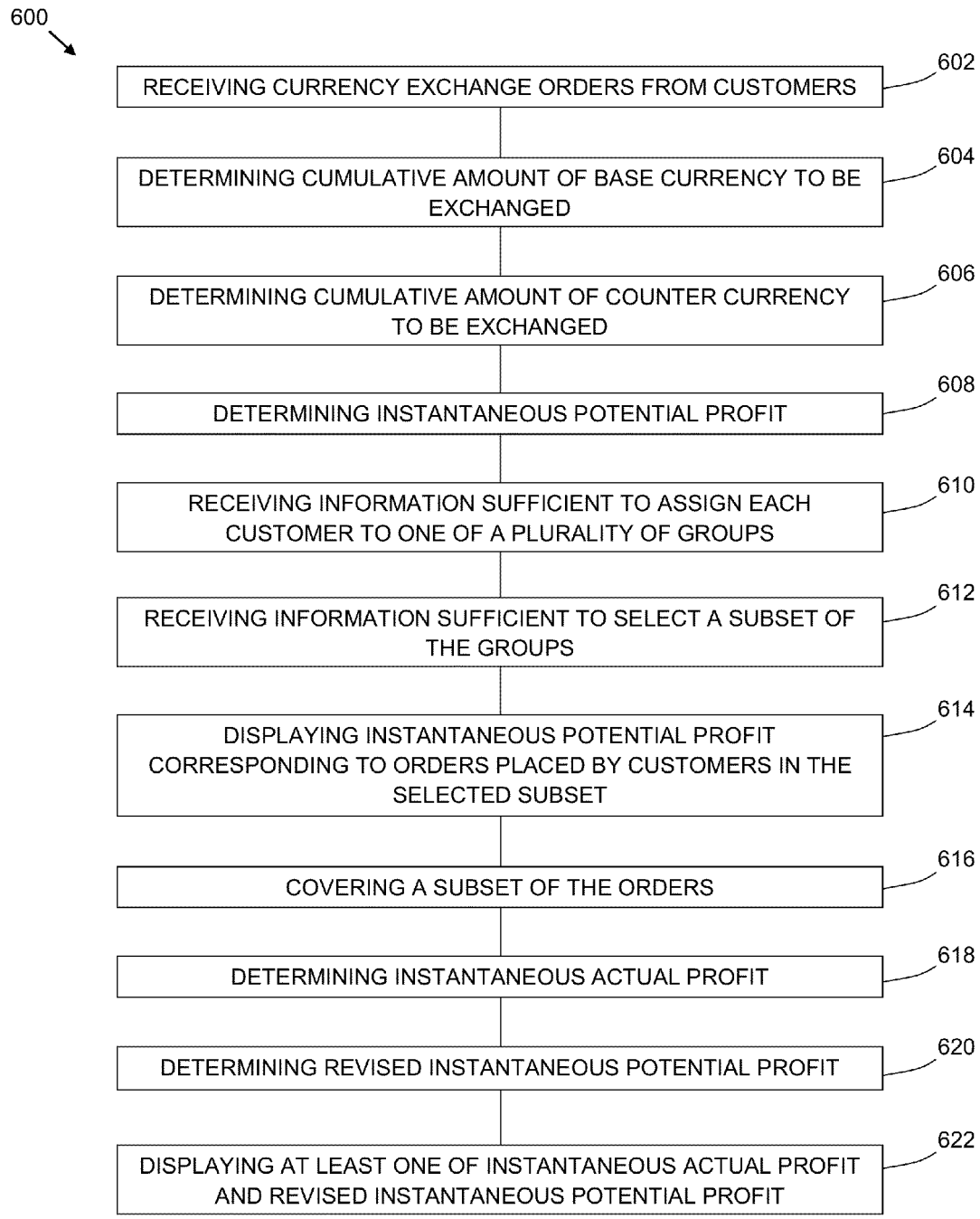
FIG. 5 is a flow diagram schematically depicting methods of managing risk when brokering foreign exchange trades, according to aspects of the present teachings.

This section describes in more detail methods that may be performed according to the present teachings; see FIG. 5.

Specifically, FIG. 5 is a flow diagram depicting a method, generally indicated at 600, of displaying information associated with currency exchange transactions in real time. At 602, method 600 includes receiving with a computer a plurality of currency exchange orders from customers, each order characterized by a currency pair including a base currency to be exchanged for a counter currency, an amount of currency to be exchanged, and an indication of whether the base currency is to be bought or sold. Customer orders may be transmitted to the computer by any suitable communications channel.

At 604, method 600 includes determining with a processor of the computer, substantially simultaneously with receiving the customer orders, a cumulative amount of the base currency of each currency pair to be exchanged in all of the orders, and at step 606, method 600 includes determining with the processor, substantially simultaneously with receiving the orders, a cumulative amount of the counter currency of each currency pair to be exchanged in all of the orders. The calculations of steps 604 and 606 typically involve simply aggregating the customer orders as they are received. However, doing this substantially simultaneously with receiving the orders, i.e., in "real time," generally cannot be done by a technologically unaided dealer, but rather requires the use of a computer.

At step 608, method 600 includes determining with the processor, substantially simultaneously with receiving the orders, an instantaneous potential profit associated with the orders, based on the cumulative amount of the base currency of each currency pair to be exchanged, the cumulative amount of the counter currency of each currency pair to be exchanged, customer exchange rates for each currency pair provided by a trader to each customer, and dealer exchange rates for each currency pair provided to the trader by at least one financial institution. Step 608 generally involves calculating the theoretical or potential profit associated with the customer orders, if the dealer were to cover all of the orders by requesting corresponding exchanges with financial institutions at the best available rates. This calculation depends on the customer orders, the customer exchange rates, and the dealer exchange rates, all of which are functions of time.

At step 610, method 600 includes receiving with the computer information sufficient to assign each customer to one of a plurality of groups, including at least a high risk group and a low risk group. As described above with regard to risk management tool 500, a customer may be assigned to a group based on many factors, such as the volume of the customer's current or past orders, the customer's past trading performance, the customer's geographic location (or the location of the customer's account), such as a country, or for any other reason at the dealer's discretion.

At step 612, method 600 includes receiving with the computer information sufficient to select a subset of the groups to which to restrict the instantaneous potential profit to be displayed. This step generally involves displaying to the dealer all of the groups to which customers have been assigned, and providing an interface, such as checkboxes, through which the dealer may select one or more of the groups for which to display information about customer orders. For instance, one reason to perform this step would be to restrict the displayed information to a high risk group of customers or transactions.

At step 614, method 600 includes displaying on a graphical user interface of the computer, substantially simultaneously with receiving the information sufficient to select the subset, a restricted instantaneous potential profit associated with each currency pair and corresponding to the orders placed by customers in the selected subset. In other words, immediately upon selecting the desired subset of groups, the display of transaction information, including the potential profit associated with the orders, is restricted to just those orders placed by customers in that subset of groups. Again, exemplary uses of this feature would be to check on the potential profit associated with orders placed by only high risk customers, low risk customers, or customers having some other distinction, such as a geographic distinction.

At step 616, method 600 optionally may include covering a subset of the orders by carrying out currency exchanges with the financial institution(s) offering the best rates corresponding to the subset of orders. For example, the dealer may wish to cover orders associated with high risk customers, if it appears that the potential profit is below some desired threshold. Similarly, the dealer may wish to cover some other subset of the customer orders based on the potential profit of that subset at a point in time.

If the dealer covers a subset of the customer orders, then at step 618, method 600 may include determining with the processor, substantially simultaneously with covering the subset of the orders, an instantaneous actual profit associated with each currency pair and corresponding to the covered subset of orders. This is profit based on a comparison of the order received from the customer and the corresponding order placed with the financial institution, which determines the profitability of the order for the dealer.

Subsequently, at step 620, method 600 may include determining with the processor, substantially simultaneously with covering the subset of the orders, a revised instantaneous potential profit associated with each currency pair based on the restricted instantaneous potential profit and the instantaneous actual profit. In other words, the processor may be instructed to remove the effects of the covered transactions from the previously determined potential profit, since the covered transactions have been completed.

Finally, at step 622, method 600 may include displaying on the graphical user interface, substantially simultaneously with covering the subset of the orders, at least one of the instantaneous actual profit and the revised instantaneous potential profit. Thus, the dealer can stay informed regarding both any realized profits and the current potential profit based on accumulated risk positions. It should be apparent that throughout the entirety of the discussion above, the "profit" (either actual or potential) at any instant of time could be either a positive number or a negative number, in which case it could also be described as a loss.

VI. Exemplary Computer Readable Media

This example discusses ways in which the present teachings may be embodied in computer programs which are stored on a computer readable medium and then executed by one or more processors of a computer system; see FIG. 6.

Specifically, FIG. 6 depicts a computer system, generally indicated at 700, which includes a processor 702 capable of executing program instructions to carry out methods according to the present teachings. A computer readable medium in the form of a compact disc containing program instructions is depicted at 704. Disc 704 may be read by a peripheral device such as a CD reader associated with computer system 700, and the instructions contained on disc 704 may be provided to processor 702.

In addition, however, computer system 700 may be configured to receive program instructions, and to provide the instructions to processor 702 for execution, in a variety of other ways. For instance, computer system 700 also includes a wired internet connection 706, and a wireless internet connection 708, each of which may allow program instructions to be transmitted to computer system 700 for execution by processor 702. For example, executable program instructions may be stored at a dedicated website or in the "cloud."

In any case, execution of the program instructions by processor 702 causes the processor to perform methods, according to aspects of the present teachings, of determining risk associated with currency exchange transactions between a customer, a dealer and a financial institution. Exemplary methods have been described above in Section V and will not be reiterated in this section.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

What is claimed is:

1. A method of displaying information associated with currency exchange transactions in real time, comprising:

receiving with a computer a plurality of currency exchange orders from a set of customers, each order characterized by a currency pair including a base currency to be exchanged for a counter currency, a customer exchange rate for the currency pair provided by a trader to the respective customer, an amount of currency to be exchanged, and an indication of whether the base currency is to be bought or sold;

determining with a processor of the computer, substantially simultaneously with receiving the orders, a cumulative amount of the base currency of each currency pair to be exchanged in all of the orders;

determining with the processor, substantially simultaneously with receiving the orders, a cumulative amount of the counter currency of each currency pair to be exchanged in all of the orders;

determining with the processor, substantially simultaneously with receiving the orders, an instantaneous potential profit associated with the orders, based on the cumulative amount of the base currency of each currency pair to be exchanged, based on the cumulative amount of the counter currency of each currency pair to be exchanged, based on the customer exchange rates for each currency pair provided by the trader to each customer, and based on dealer exchange rates for each currency pair provided to the trader by at least one financial institution;

receiving with the computer information sufficient to assign each customer of the set to one of a plurality of groups, including at least a high risk group and a low risk group;

receiving with the computer information sufficient to select a subset of the groups to which to restrict the instantaneous potential profit to be displayed; and displaying on a graphical user interface of the computer, substantially simultaneously with receiving the information sufficient to select the subset, the instantaneous potential profit associated only with the orders received with the computer from the customers in the selected subset.

2. The method of claim 1, wherein the plurality of groups further includes at least one group based on a geographic distinction of the customers in the group.

3. The method of claim 2, wherein the geographic distinction is a country in which the order was received.

4. The method of claim 1, further comprising:

covering a subset of the orders by carrying out currency exchanges with the financial institution;

determining with the processor, substantially simultaneously with covering the subset of the orders, an instantaneous actual profit associated with each currency pair and corresponding to the covered subset of orders;

determining with the processor, substantially simultaneously with covering the subset of the orders, a revised instantaneous potential profit associated with each currency pair based on the instantaneous potential profit associated only with the orders placed by customers in the selected subset and the instantaneous actual profit; and displaying on the graphical user interface, substantially simultaneously with covering the subset of the orders, at least one of the instantaneous actual profit and the revised instantaneous potential profit.

5. The method of claim 1, wherein the customer exchange rates provided to each customer are based at least partially on whether or not the customer is assigned to the high risk group.

6. The method of claim 1, wherein the customer exchange rates provided to each customer are based at least partially on a risk group to which the customer is assigned and at least partially on a volume of the order expected to be received from the customer.

7. The method of claim 1, wherein the customer exchange rates provided to each customer are based at least partially on a predefined setting associated with the customer, in combination with the dealer exchange rates.

8. The method of claim 1, wherein the customer exchange rates provided to each customer are based at least partially on a market condition.

9. The method of claim 1, wherein the customer exchange rates provided to each customer are based at least partially on a volume of the order expected to be received from the customer.

10. A system for managing currency exchange transactions, comprising:

a computer including a processor configured to calculate profit and risk information relating to a plurality of currency exchange transactions substantially in real time, and a graphical user interface configured to display the profit and risk information;

a first electronic communication channel configured to transmit customer currency exchange orders to the computer; and a second electronic communication channel configured to transmit dealer currency exchange orders from the computer to at least one financial institution;

wherein each currency exchange order is characterized by a currency pair including a base currency to be exchanged for a counter currency, a customer exchange rate for the currency pair, an amount of currency to be exchanged, and an indication of whether the base currency is to be bought or sold;

wherein the processor is configured to calculate, substantially simultaneously with receiving the customer currency exchange orders:

(i) a cumulative amount of the base currency of each currency pair to be exchanged in all of the customer currency exchange orders;

(ii) a cumulative amount of the counter currency of each currency pair to be exchanged in all of the customer currency exchange orders; and (iii) an instantaneous potential profit associated with the customer currency exchange orders, based on the cumulative amount of the base currency of each currency pair to be exchanged, the cumulative amount of the counter currency of each currency pair to be exchanged, the customer exchange rates provided by a dealer to each customer, and dealer exchange rates provided by a financial institution to the dealer;

wherein the computer is configured to receive a group indicator for each customer associating each customer with one of a plurality of groups, including at least a high risk group and a low risk group;

wherein the computer is configured to receive subset selection information corresponding to a dealer's selection of a subset of the groups; and wherein the computer is configured to display on the graphical user interface, substantially simultaneously with selection of the subset of the groups, the instantaneous potential profit associated with each currency pair and corresponding to the customer orders received with the computer from the customers in the selected subset.

11. The system of claim 10, wherein the first and second electronic communication channels are secure internet connections.

12. The system of claim 10, wherein the customer exchange rates provided to each particular customer are based at least partially on a risk group to which the particular customer is assigned.

13. The system of claim 10, wherein the customer exchange rates provided to each particular customer are based on a risk group to which the particular customer is assigned, in combination with the dealer exchange rates.

14. The system of claim 10, wherein the customer exchange rates provided to each particular customer are based at least partially on a predefined setting associated with the particular customer, in combination with the dealer exchange rates.

15. The system of claim 10, wherein the customer exchange rates are based at least partially on a market condition.

16. A non-transitory machine-readable medium containing program instructions for determining risk associated with currency exchange transactions between a customer, a dealer and a financial institution, wherein execution of the program instructions by one or more processors of a computer system causes the processors to carry out the steps of:

receiving a plurality of currency exchange orders from customers, each order characterized by a currency pair including a base currency to be exchanged for a counter currency, a customer exchange rate for the currency pair, an amount of currency to be exchanged, and an indication of whether the base currency is to be bought or sold;

determining, substantially simultaneously with receiving the orders, a cumulative amount of the base currency of each currency pair to be exchanged in all of the orders;

determining, substantially simultaneously with receiving the orders, a cumulative amount of the counter currency of each currency pair to be exchanged in all of the orders;

determining, substantially simultaneously with receiving the orders, an instantaneous potential profit associated with each currency pair, based on the cumulative amount of the base currency of each currency pair to be exchanged, based on the cumulative amount of the counter currency of each currency pair to be exchanged, based on the customer exchange rates for each currency pair provided by a dealer to each customer, and based on dealer exchange rates for each currency pair provided to the dealer by at least one financial institution;

receiving a group indicator assigning each of the customers to one of a plurality of groups, including at least a high risk group and a low risk group;

receiving a subset selection indicator corresponding to selection of a subset of the groups; and displaying on a graphical user interface of the computer system, substantially simultaneously with selecting the subset of the groups, the instantaneous potential profit associated with each currency pair and corresponding to the orders received with the computer system from the customers in the selected subset.

17. The non-transitory machine-readable medium of claim 16, wherein the customer exchange rates for each customer are based at least partially on a risk group to which the customer is assigned.

18. The non-transitory machine-readable medium of claim 16, wherein the customer exchange rates for each customer are based at least partially on a volume of the order expected to be received from the customer.

19. The non-transitory machine-readable medium of claim 16, wherein the customer exchange rates for each customer are based at least partially on a predefined rate setting associated with the customer, in combination with the dealer exchange rates.

20. The non-transitory machine-readable medium of claim 16, wherein the customer exchange rates are based at least partially on a market condition.

* * * * *